(12) United States Patent
Koh (10) Patent No.: US 7,938,353 B2
(45) Date of Patent: May 10, 2011

(54) BRAKE SYSTEM OF FISHING REEL

(75) Inventor: Young Ju Koh, Seoul (KR)

(73) Assignee: Cocus Co., Ltd., Gyeonggi-Do (KR)

( * ) Notice: Subject to any disclaimer, the term of this patent is extended or adjusted under 35 U.S.C. 154(b) by 0 days.

(21) Appl. No.: 12/643,820

(22) Filed: Dec. 21, 2009

(65) Prior Publication Data
US 2011/0073697 A1 Mar. 31, 2011

(30) Foreign Application Priority Data

Sep. 28, 2009 (KR) .................. 10-2009-0091938

(51) Int. Cl.
*A01K 89/01* (2006.01)
(52) U.S. Cl. ..................................... 242/289
(58) Field of Classification Search .................. 242/288, 242/289
See application file for complete search history.

(56) References Cited

U.S. PATENT DOCUMENTS

| | | | | |
|---|---|---|---|---|
| 4,601,438 A * | 7/1986 | Young | ............................ | 242/289 |
| 5,318,245 A * | 6/1994 | Sato et al. | ..................... | 242/288 |
| 6,086,005 A * | 7/2000 | Kobayashi et al. | ........... | 242/288 |
| 6,126,105 A * | 10/2000 | Yamaguchi | ................... | 242/288 |
| 6,966,517 B2 * | 11/2005 | Seo | ................................ | 242/289 |
| 7,168,533 B2 * | 1/2007 | Podratzky | ..................... | 188/185 |
| 7,374,120 B2 * | 5/2008 | Hyun | ............................. | 242/289 |
| 7,618,003 B2 * | 11/2009 | Rho | ............................. | 242/288 |
| 7,648,096 B2 * | 1/2010 | Niitsuma et al. | .............. | 242/289 |
| 7,780,105 B2 * | 8/2010 | Hyun | ............................. | 242/289 |

* cited by examiner

*Primary Examiner* — Emmanuel M Marcelo
(74) *Attorney, Agent, or Firm* — IPLA P.A.; James E. Bame (57) ABSTRACT

Disclosed herein is a brake system for a fishing reel. The brake system includes a spool cover which is provided between a spool and a left cover, and a brake assembly which is provided between the spool and the spool cover. The spool cover has a cylindrical inner sidewall, a first brake collar which is provided on the inner surface of the sidewall, a circular protrusion which is provided on the central portion of the spool cover, and a second brake collar or one way ring which is provided on the circular protrusion. The brake assembly includes a brake housing, brake shoes, expansion springs, and a housing cover. The brake housing has inner seating depressions and outer seating depressions therein. The brake shoes are inserted into the inner seating depressions. The expansion springs are inserted into the inner seating depressions to elastically support the brake shoes. The housing cover is coupled to the outer surface of the brake housing to prevent the brake shoes and the expansion springs from being removed from the brake housing.

8 Claims, 13 Drawing Sheets

BRAKE SYSTEM OF FISHING REEL

CROSS REFERENCES

Applicant claims foreign priority under Paris Convention and 35 U.S.C. §119 to Korean Patent Application No. 10-2009-0091938, filed Sep. 28, 2009, with the Korean Intellectual Property Office, where the entire contents are incorporated herein by reference.

BACKGROUND OF THE INVENTION

1. Field of the Invention

The present invention relates generally to brake systems of fishing reels and, more particularly, to a brake system of a fishing reel which is constructed such that while a spool is rotated by casting a fishing line, when a fishing sinker or hook which was cast passes over the peak and the speed thereof reduces, the rotating force of the spool is gradually reduced and stopped, thus preventing the fishing line from being entangled, thereby being more convenient for a user and enhancing the performance of a product.

2. Description of the Related Art

Generally, spool drag or spool brake systems of fishing reels are commonly used in baitcasting reels to mitigate line backlashing (referred to as "line nesting"; a phenomenon of a line being entangled by excessive rotation of a spool) problems.

Because the spool drag or spool brake systems use transversely-oriented spools which rotate during casting, baitcasting reels are more prone to backlashing problems than are spinning reels and spin-casting reels.

Such problems result typically from the rotational momentum carried by the spool.

A variety of brake systems have been developed to reduce backlashing problems. Such brake systems have typically used a magnetic brake or a centrifugal brake.

Centrifugal brake systems have an advantage over magnetic systems in that the braking force of a centrifugal brake increases as rotational speed increases, unlike the magnetic systems.

A representative example of such centrifugal brake systems according to conventional techniques was proposed in Korean Patent Laid-open Publication No. 2002-19401 which was entitled "ADJUSTABLE BRAKE FOR BAITCAST REEL WITH INFINITE CONTROL".

This conventional technique will be briefly explained. The brake for fishing reels includes a support structure, a rotatable line spool, a plurality of braking elements, at least one rotatable cam, at least one interacting member and at least one biasing member. The support structure supports a braking surface having a frusto-conical shape. The braking elements rotate along with the line spool and operate and come into contact with the braking surface. The cam includes at least one ramp part which has an outer end and a base end. The interacting member protrudes from the support structure to interact with the cam. The biasing member continuously applies force to the interacting member such that the interacting member is in contact with the cam. When the interacting member comes into contact with the base end, the braking surface is located at a first position. When the interacting member comes into contact with the outer end, the braking surface is located at a second position. The braking elements are positioned to be sequentially encompassed by the braking surface as the braking surface moves between the first position and the second position.

In the conventional brake having the above-mentioned construction, the braking elements protrude outwards from a braking element assembly and come into contact with the braking surface which is formed on a perimeter of an inner surface of a brake ring, thus reducing the rotating force of the spool.

However, in the conventional brake, the braking elements come into contact with only the perimeter of the brake ring. In this case, after a fishing line is cast and a fishing sinker or hook passes over the peak, when the speed at which the fishing sinker or hook pulls the fishing line is reduced, the centrifugal force of the braking element assembly is also reduced. Thus, the braking elements can no longer control the rotation of the spool. Therefore, the rotating speed of the spool may exceed the speed at which the fishing line is unwound from the spool, thus resulting in the fishing line becoming entangled.

To avoid this problem and prevent the fishing line from becoming entangled, a high level of technique in which a user must control the rotation of the spool using his/her thumb is required. This problem makes it difficult for a beginner to enjoy fishing.

SUMMARY OF THE INVENTION

Accordingly, the present invention has been made keeping in mind the above problems occurring in the prior art, and an object of the present invention is to provide a brake system of a fishing reel in which inside brake shoes which are elastically supported by springs are installed in a circumferential inner surface of a brake assembly which are coupled to a spool to control the rotating force of the spool, wherein to prevent the inside brake shoes from affecting the distance that a fishing sinker is driven, when the rotating force of the spool becomes smaller, the inside brake shoes are made to come into contact with an inner ring of a spool cover because of the elastic force of the springs and thus brake the spool, so that although a user does not control the rotation of the spool using his/her thumb, the fishing line can be prevented from getting tangled, thus enabling even a beginner to easily use the fishing reel, and being more convenient to the user.

In order to accomplish the above object, the present invention provides a brake system of a fishing reel. A brake assembly is provided between a spool and a spool cover. The brake assembly includes a brake housing, brake shoes, expansion springs and a housing cover. Seating depressions are formed in the brake housing and extend to the circumferential inner surface of the brake housing. The brake shoes are individually inserted into the seating depressions. The expansion springs are individually inserted into the seating depressions to elastically support the corresponding brake shoes. The housing cover is coupled to the outer surface of the brake housing to prevent the brake shoes and the expansion springs from being removed from the brake housing.

In another aspect, the present invention provides a brake system of a fishing reel which includes a magnetic brake which generates braking force using a magnetic body in combination with the centrifugal brake having the above structure.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings.

Figure 1:
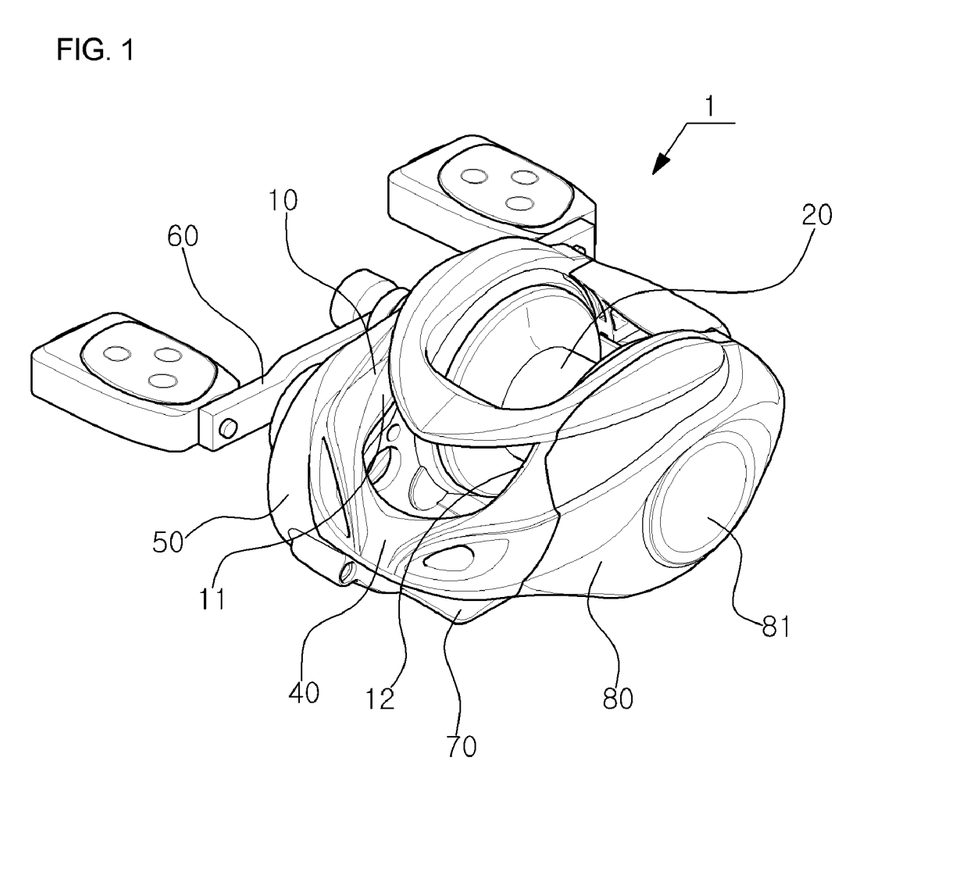
FIG. 1 is a perspective view of a fishing reel, according to the present invention.
Figure 2:
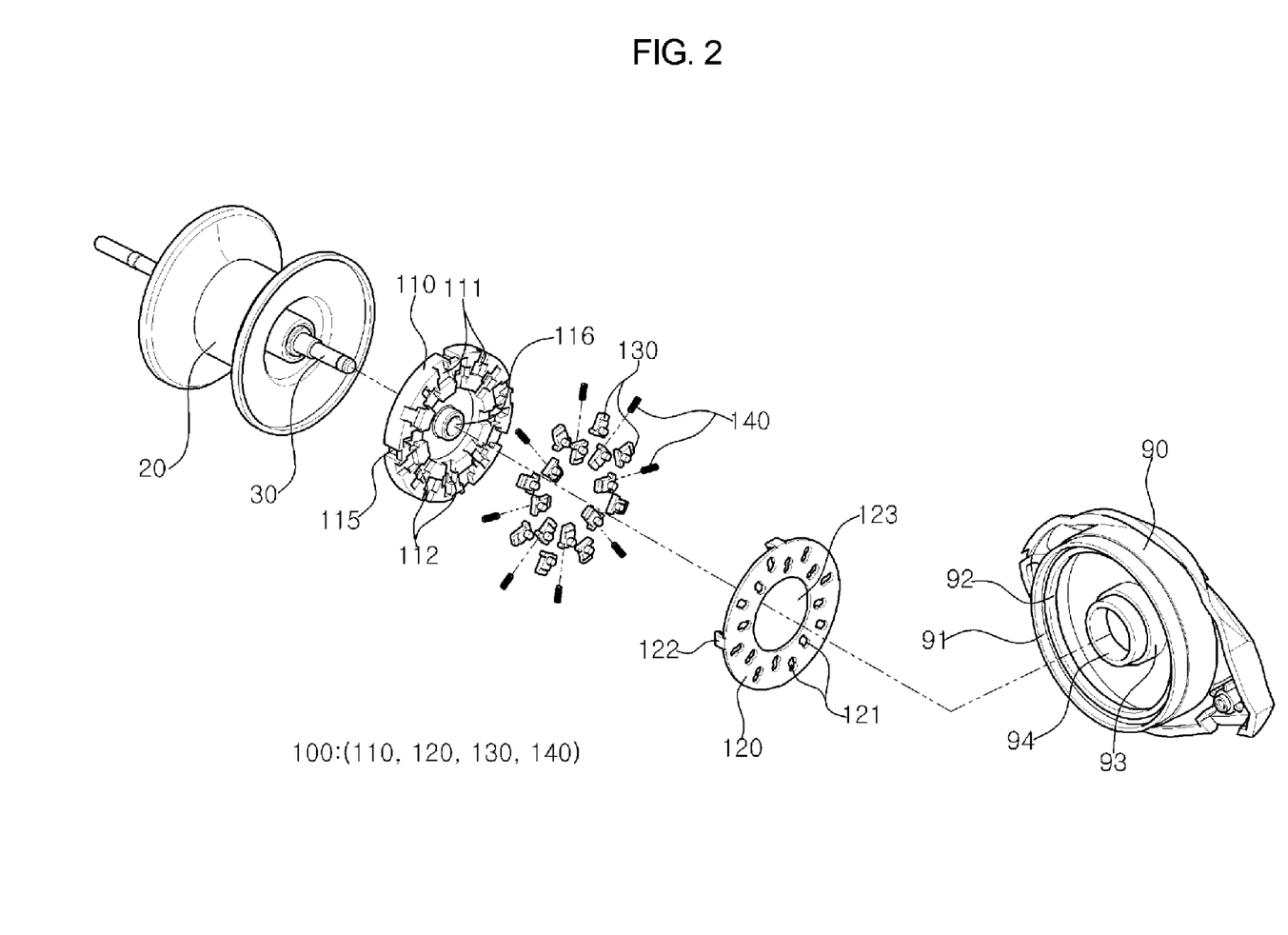
FIG. 2 is an exploded perspective view illustrating a spool, a brake assembly and a spool cover of a fishing reel according to an embodiment of the present invention.
Figure 3:
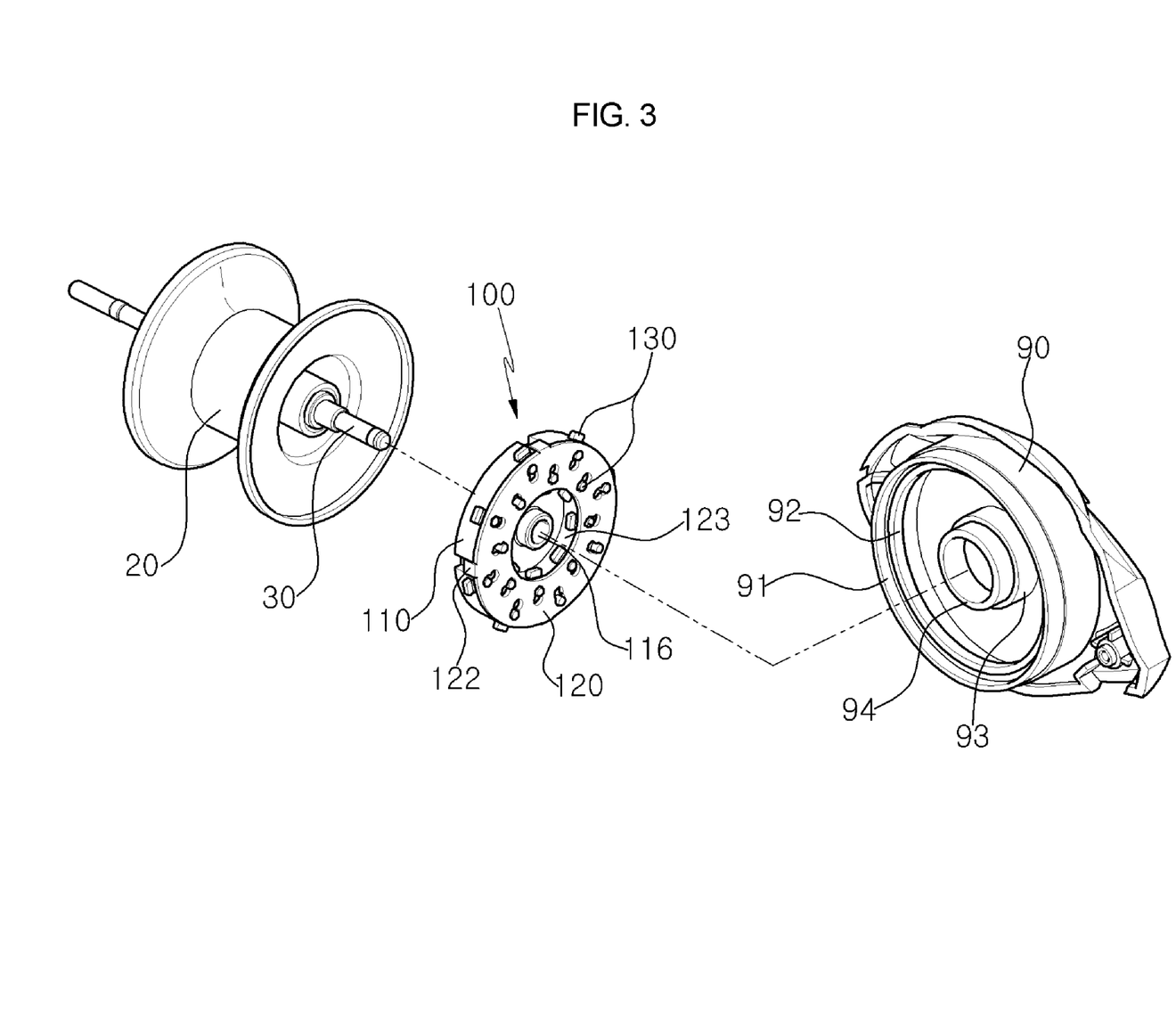
FIG. 3 is another exploded perspective view illustrating the spool, the brake assembly and the spool cover of the fishing reel of FIG. 2.
Figure 4:
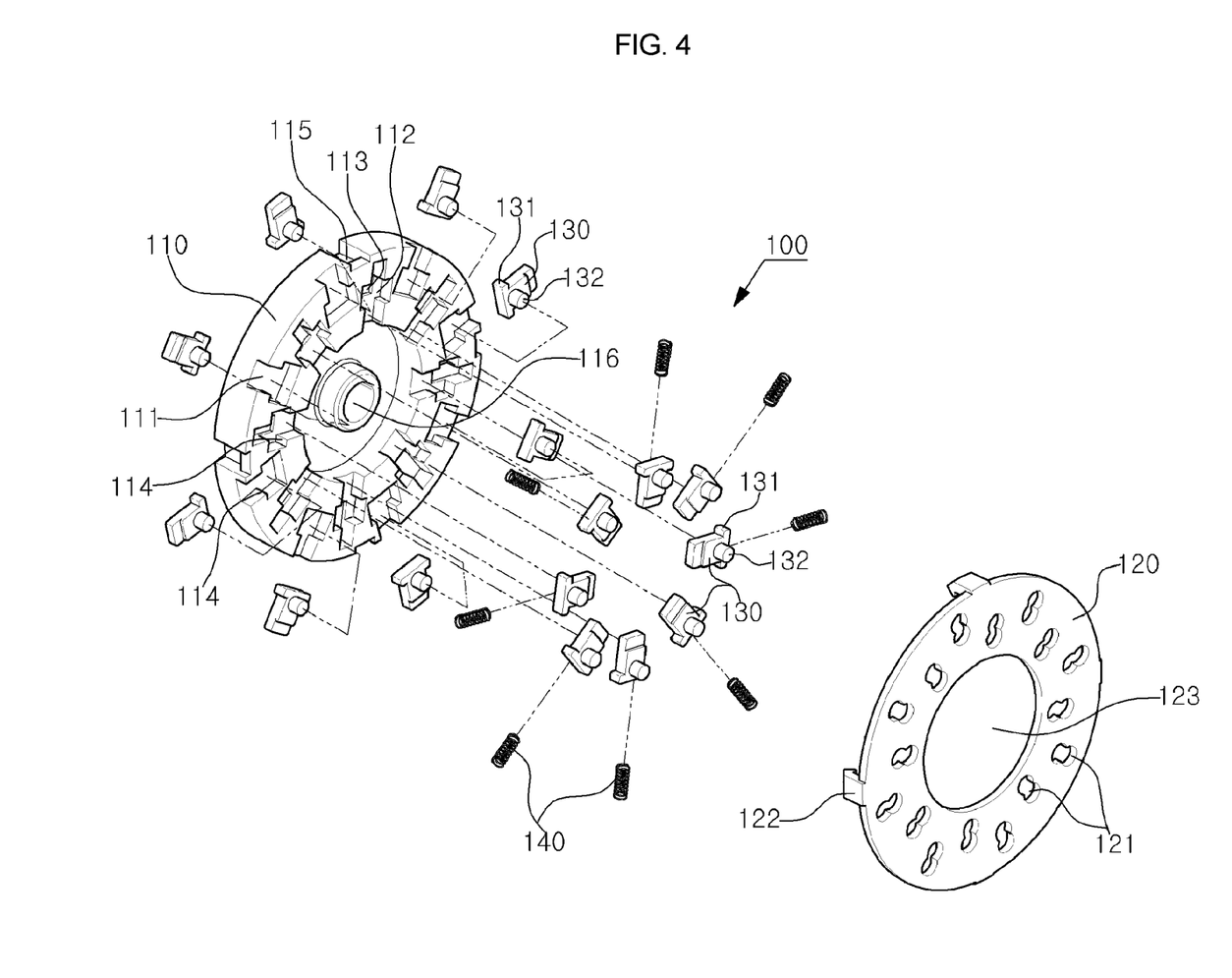
FIG. 4 is an exploded perspective view of the brake assembly of the fishing reel of FIG. 2.
Figure 5:
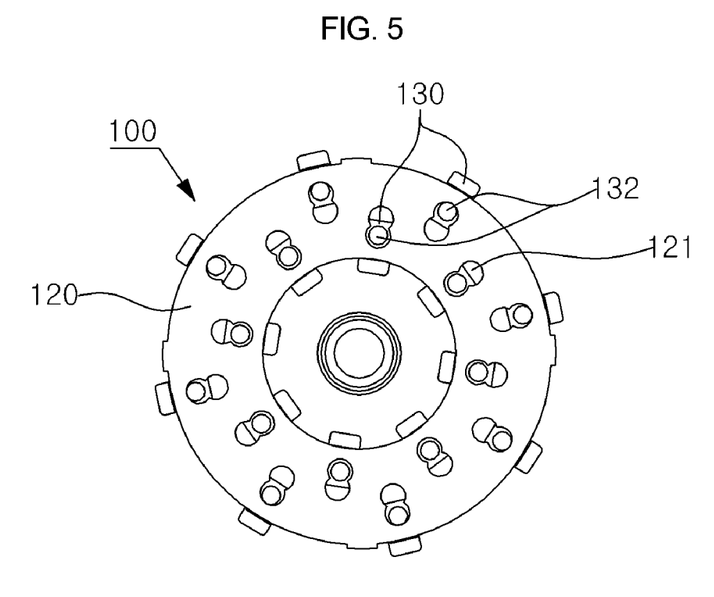
FIG. 5 is a front view showing the brake assembly of FIG. 4.
Figure 6:
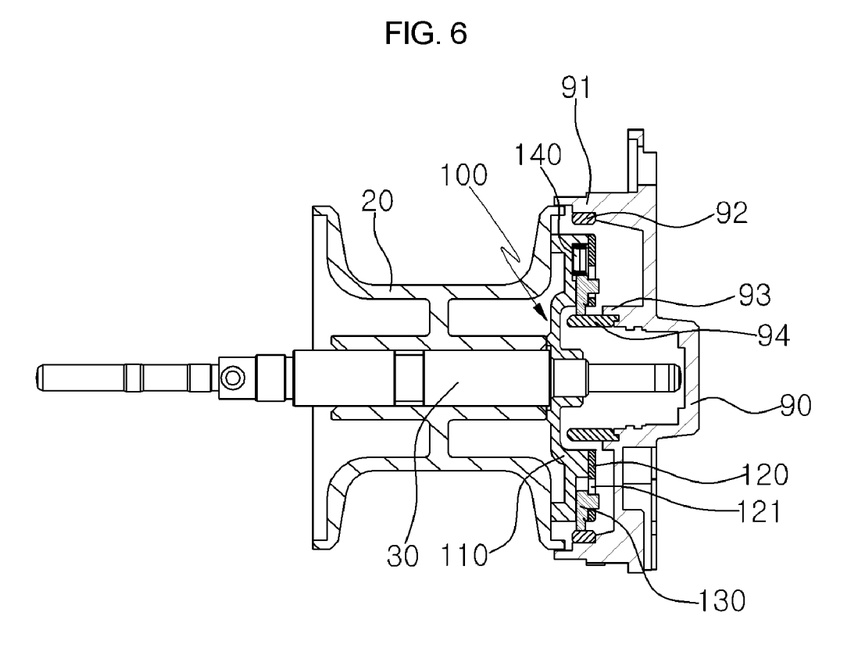
FIG. 6 is a sectional view illustrating critical elements of the fishing reel of FIG. 2.
Figure 7:
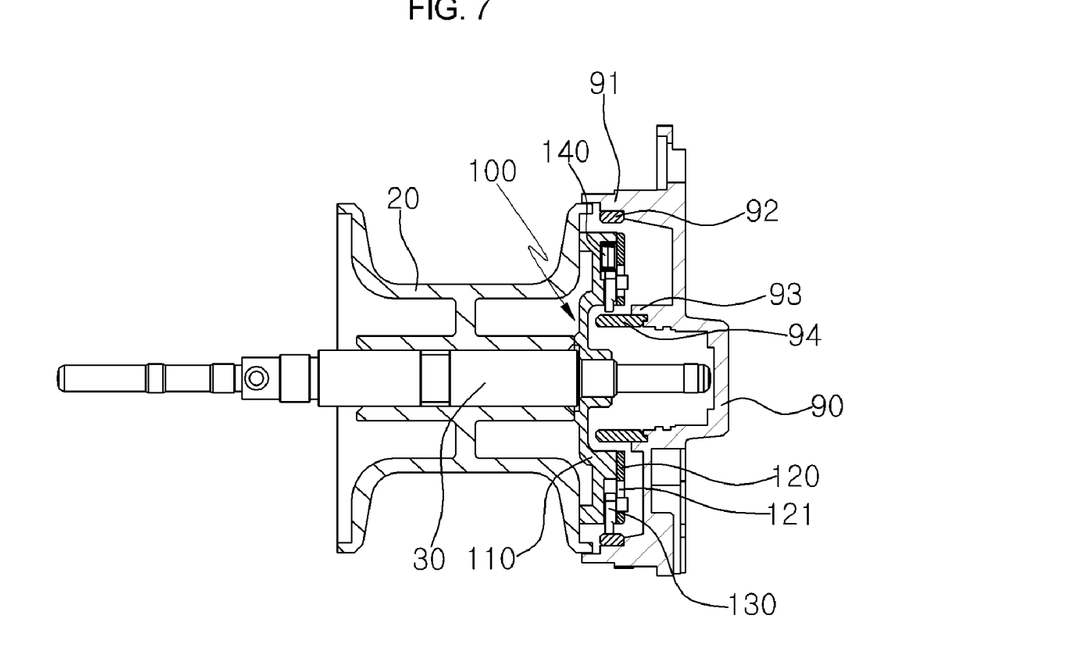
FIG. 7 is a sectional view showing the operation of the brake assembly when the rotating force of the spool of the fishing reel increases.
Figure 8:
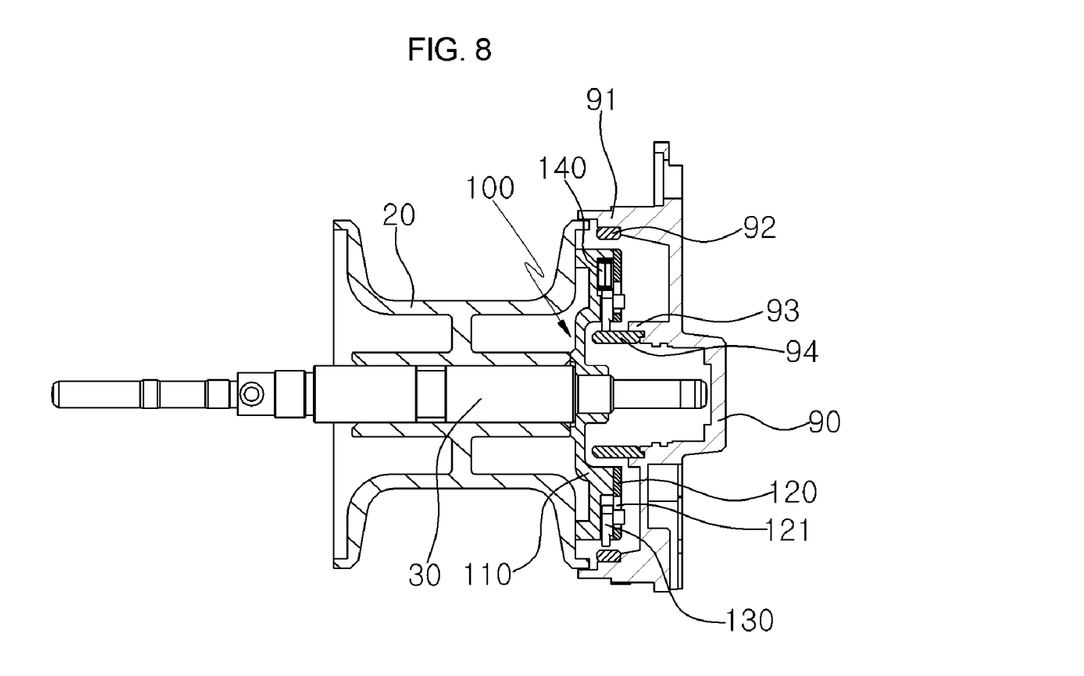
FIG. 8 is a sectional view showing the operation of the brake assembly when the rotating force of the spool of the fishing reel reduces.

FIG. 1 is a perspective view of a fishing reel 1, according to an embodiment of the present invention. FIG. 2 is an exploded perspective view illustrating a spool 20, a brake assembly 100 and a spool cover 90 of the fishing reel 1. FIG. 3 is another exploded perspective view illustrating the spool 20, the brake assembly 100 and the spool cover 90 of the fishing reel 1. FIG. 4 is an exploded perspective view showing the brake assembly 100 of the fishing reel 1. FIG. 5 is a front view showing the brake assembly 100. FIG. 6 is a sectional view illustrating critical elements of the fishing reel 1. FIG. 7 is a sectional view showing the operation of the brake assembly 100 when the rotating force of the spool 20 of the fishing reel 1 increases. FIG. 8 is a sectional view showing the operation of the brake assembly 100 when the rotating force of the spool 20 of the fishing reel 1 is reduced.

The fishing reel 1 according to the embodiment of the present invention includes a frame 10, the spool 20, a main shaft 30, a level-wind mechanism 40, a right cover 50, a handle 60, a reel foot 70 and a left cover 80. The frame 10 includes a right plate 11 and a left plate 12. The spool 20 is rotatably installed in the frame 10 between the left and right plates 12 and 11. A line is wound around the spool 20. The main shaft 30 extends through the spool 20. The level-wind mechanism 40 traverses the spool 20 while being rotated such that the line is appropriately wound along the entire length of the spool 20. The right cover 50 is fastened to the outer surface of the right plate 11. The handle 60 operably extends from the right cover 50 to enable a user to rotate the spool 20. The reel foot 70 is provided on the bottom of the frame 10 to attach the reel 1 to a fishing rod. The left cover 80 is fastened to the outer surface of the left plate 12.

Furthermore, the spool cover 90 is provided between the spool 20 and the left cover 80.

The brake assembly 100 is provided between the spool 20 and the spool cover 90 to control the rotating force of the spool 20.

The spool cover 90 has a cylindrical inner sidewall 91, and a first brake collar 92 which is provided on the inner surface of the sidewall 91.

In addition, the spool cover 90 has a circular protrusion 93 on the central portion thereof. Furthermore, a second brake collar or one way ring 94 is provided on the circular protrusion 93.

The brake assembly 100 includes a brake housing 110, a housing cover 120 which is coupled to the brake housing 110, brake shoes 130 which are provided in the brake housing 110, and expansion springs 140 which elastically support the brake shoes 130.

Outer seating depressions 111 are formed in the perimeter of the upper surface of the brake housing 110 at positions spaced apart from each other at regular angular intervals. Some of the brake shoes 130 are respectively seated into the outer seating depressions 111 such that the outer ends of the brake shoes 130 are extractable outwards from the circumferential outer surface of the brake housing 110. Inner seating depressions 112 are respectively formed in the upper surface of the brake housing 110 between the adjacent outer seating depressions 111 inside the outer seating depressions 111. Remaining brake shoes 130 are seated into the inner seating depressions 111 such that the inner ends of the brake shoes 130 are extractable from the circumferential inner surface of the brake housing 110.

Furthermore, a spring insert depression 113 extends from each inner seating depression 112 of the brake housing 110. Each expansion spring 140 is inserted into the corresponding spring insert depression 113.

Preferably, stepped portions 114 are provided in each of the inner and outer seating depressions 112 and 111 in order to prevent the brake shoe 130 from being undesirably removed therefrom.

In addition, a plurality of locking depressions 115 is formed in the circumferential outer surface of the brake housing 110.

The brake shoes 130 are inserted into the corresponding inner and outer seating depressions 112 and 111. Stop protrusions 131 are provided on one end of each brake shoe 130 and are stopped by the stepped portions 114 to prevent the brake shoe 130 from being undesirably removed from the corresponding inner or outer seating depression 112 or 111. A support protrusion 132 is provided on the upper surface of each brake shoe 130.

Guide slots 121 are formed through the perimeter of the housing cover 120, so that the support protrusions 132 of the brake shoes 130 are respectively inserted into the guide slots 121 and thus guided inwards or outwards by the guide slots 121. Locking hooks 122 are provided on the circumferential outer edge of the housing cover 120. The locking hooks 122 are locked to the corresponding locking depressions 115 of the brake housing 110 to couple the housing cover 120 to the brake housing 110.

Through holes 116 and 123 into which the main shaft 30 is inserted are respectively formed through the central portion of the brake housing 110 and the central portion of the housing cover 120.

The brake housing 110 and the housing cover 120 of the brake assembly 100 are made of synthetic resin.

Meanwhile, a brake system according to another embodiment of the brake system according to the present invention will be described below. As shown in FIGS. 9 through 12 and 17, a magnetic brake 200 is mounted to an inner surface of a spool cover 90. A brake assembly 100 is made of appropriate metal such that a magnetic body of the magnetic brake 200 can affect it.

Figure 9:
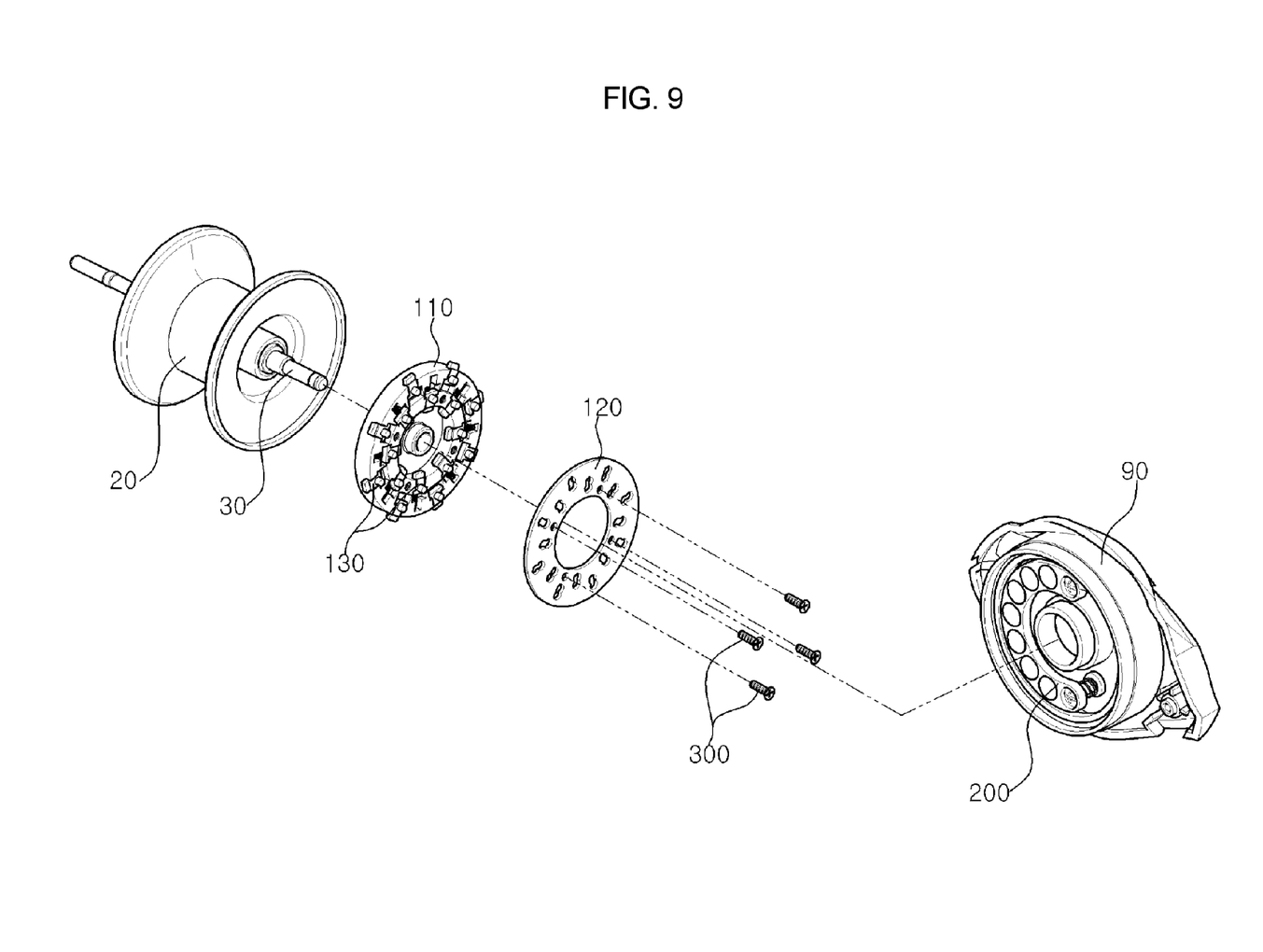
FIG. 9 is an exploded perspective view illustrating a fishing reel, according to another embodiment of the present invention.
Figure 10:
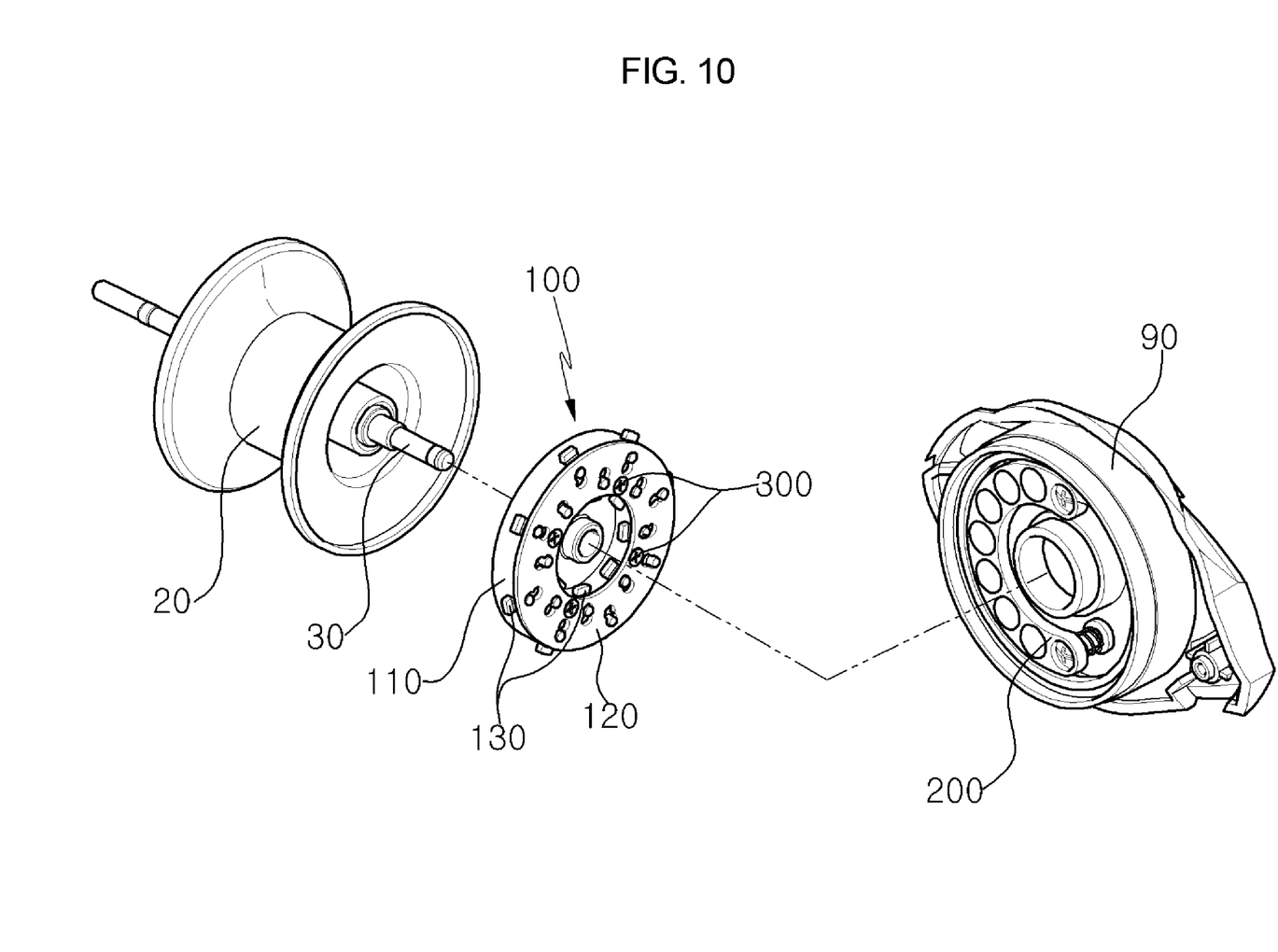
FIG. 10 is an exploded perspective view of the fishing reel of FIG. 9.
Figure 11:
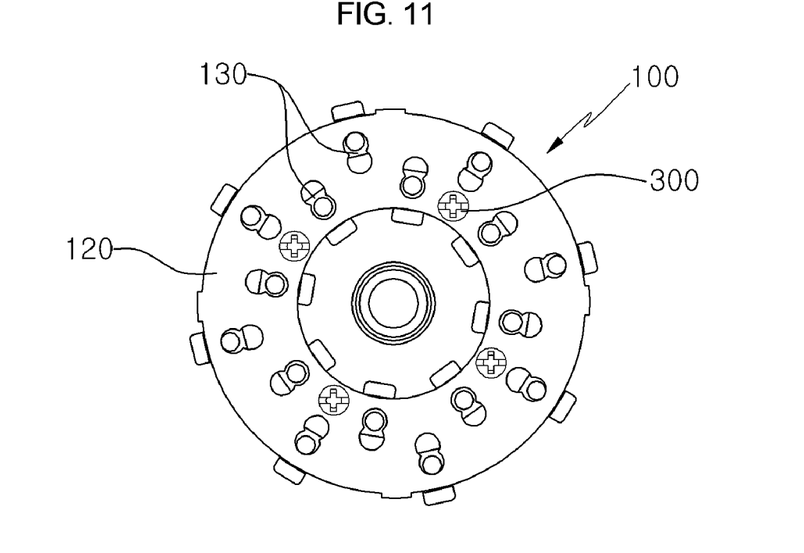
FIG. 11 is a front view of a brake assembly of the fishing reel of FIG. 9.
Figure 12:
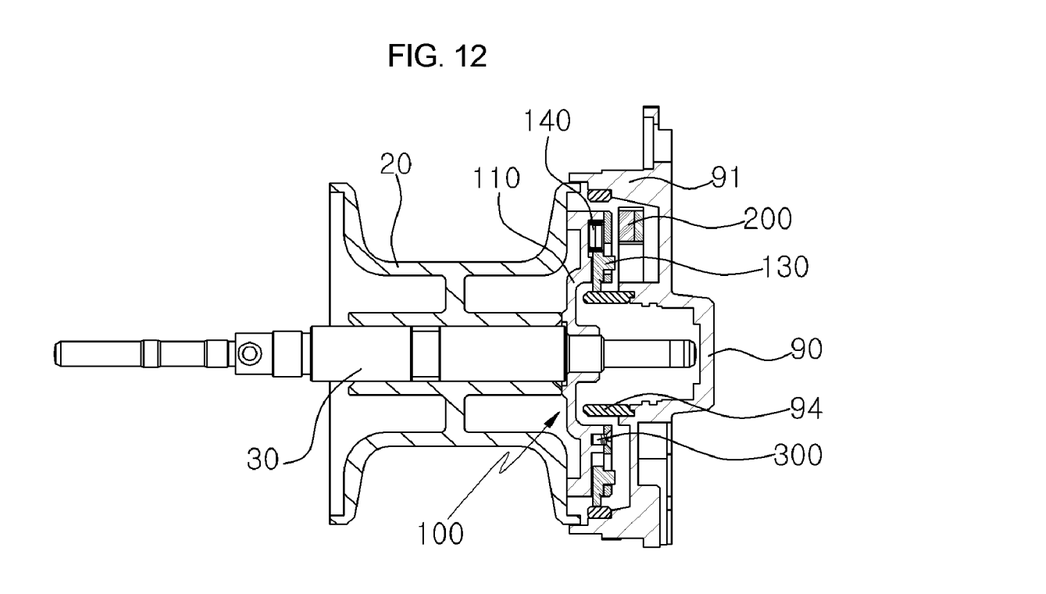
FIG. 12 is a sectional view showing the fishing reel of FIG. 9.
Figure 13:
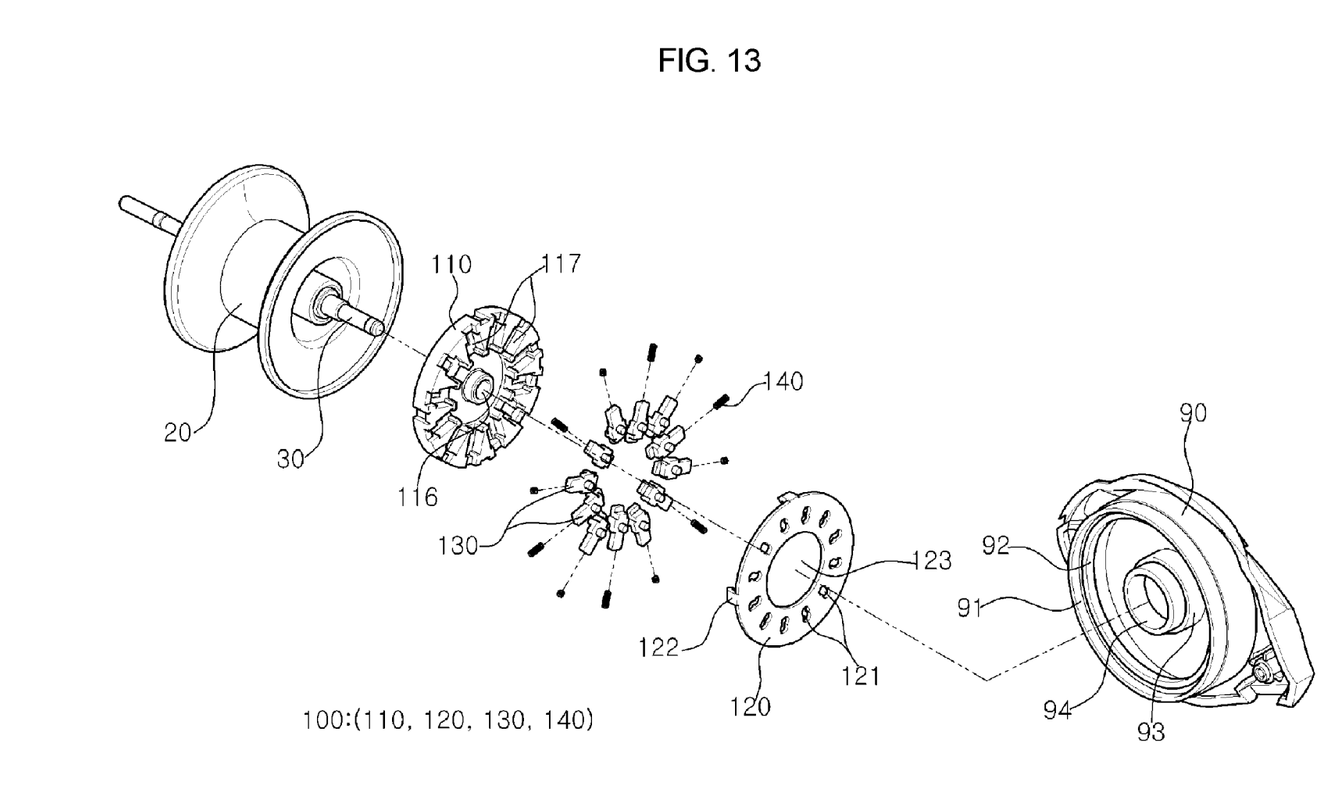
FIG. 13 is an exploded perspective view illustrating a fishing reel, according to a further embodiment of the present invention.
Figure 14:
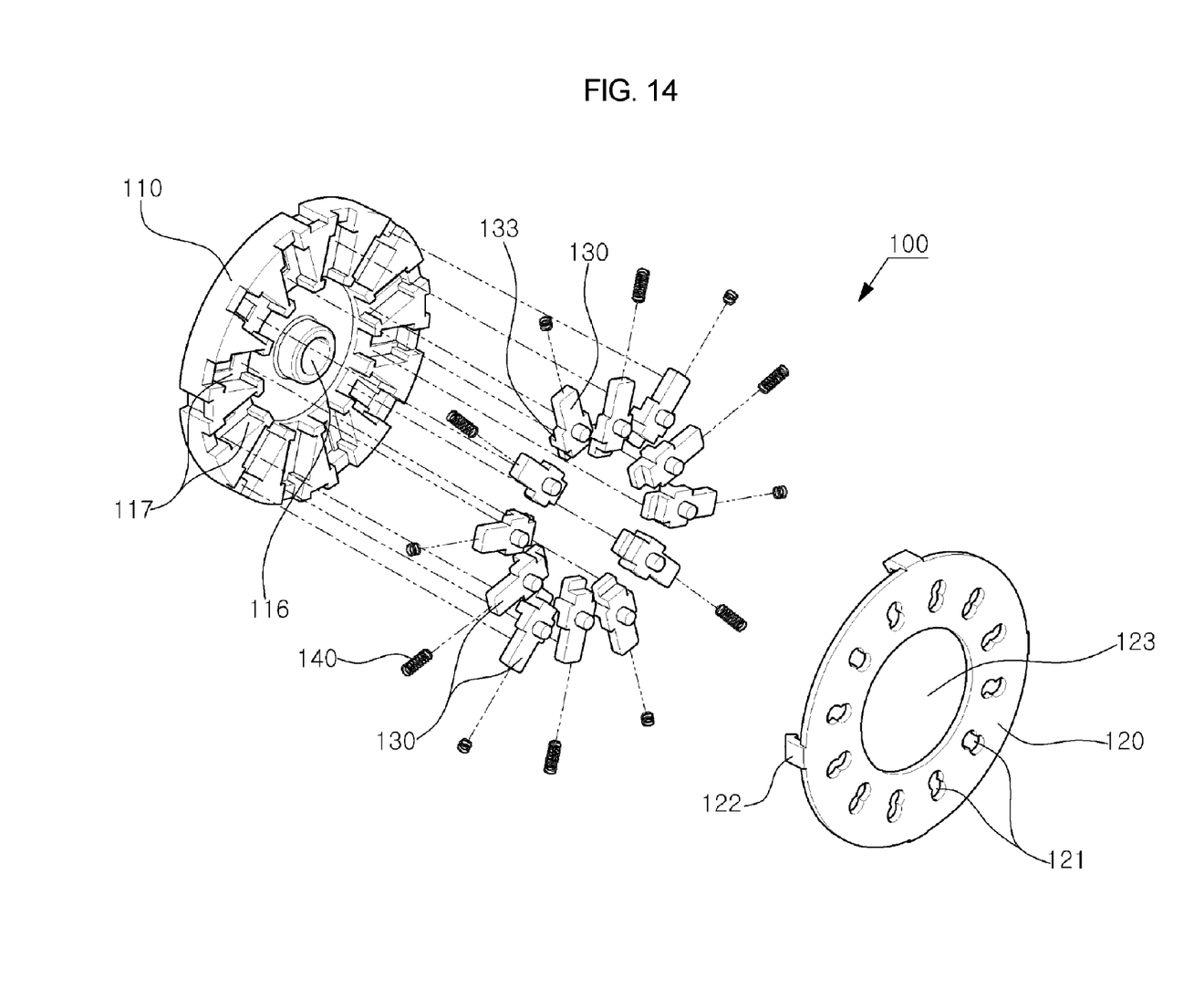
FIG. 14 is a front view of a brake assembly of the fishing reel of FIG. 13.
Figure 15:
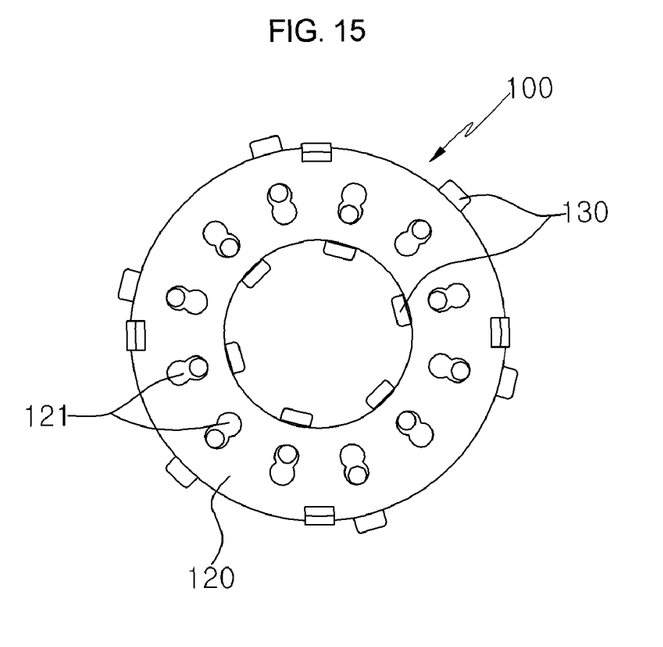
FIG. 15 is a front view of a brake assembly of the fishing reel of FIG. 13.
Figure 16:
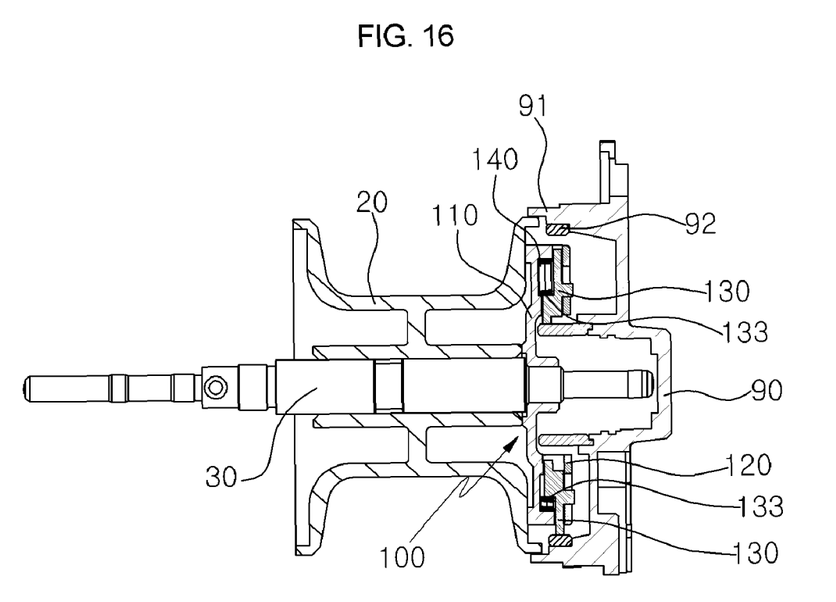
FIG. 16 is a sectional view showing the fishing reel of FIG. 13.

Preferably, a brake housing 110 and a housing cover 120 of the brake assembly 100 is coupled to each other by flat head screws 300.

Magnetic braking using the magnetic brake 200 is a well known technique which is used in a typical magnetic brake system, therefore further explanation will be omitted.

In the brake system according to the present invention, in the case where the magnetic brake 200 is mounted to the spool cover 90, brake shoes 130 may be provided in outer seating depressions 111 of the brake housing 110 such that ends thereof protrude outwards from the brake housing 110 or, alternatively, no brake shoes 130 may be provided in the outer seating depressions 111. As such, even if the brake housing 110 has no brake shoe 130, the braking operation can be conducted without any problem.

Meanwhile, a brake system according to a further embodiment of the present invention will be described below. As shown in FIGS. 13 through 16, in this embodiment, seating depressions 117 are formed in a perimeter of an upper surface of a brake housing 110 of a brake assembly 100 at positions spaced apart from each other at regular angular intervals. Brake shoes 130 are respectively seated into the seating depressions 117. Here, expansion springs 140 are disposed in the corresponding seating depressions 117 which contain the brake shoes 130 which protrude inwards from the circumferential inner surface of the brake housing 110. The expansion springs 140 elastically support the corresponding brake shoes 130.

Furthermore, a stopper 133 to which the corresponding expansion spring 140 is supported is provided under the lower surface of each corresponding brake shoe 130.

In the drawings, reference numeral 81 denotes a brake dial.

Hereinafter, the operation of the present invention having the above-mentioned construction will be described in detail.

First, the reel 1 according to the present invention is coupled to a fishing rod. Thereafter, the fishing line is cast. Then, the fishing line is unwound from the spool 20, and the spool 20 rotates in the direction in which the fishing line is cast.

At this time, due to centrifugal force generated by the rotation of the spool 20, the brake shoes 130 which are provided in the outer seating depressions 111 of the brake housing 110 protrude outwards while the support protrusions 132 of the brake shoes 130 of the brake shoes 130 are guided outwards along the corresponding guide slots 121. Thereby, the outer ends of the brake shoes 130 come into contact with the inner surface of the first brake collar 92.

Thus, as shown in FIG. 7, when the fishing line is unwound from the spool 20 and the spool 20 is rotated, the brake shoes 130 which come into contact with the first brake collar 92 can prevent the spool 20 from rotating at excessive speed.

Furthermore, after the fishing line which is being unwound by the rotation of the spool 20 reaches the peak, when a sinker or a fishing hook which is tied to the fishing line moves downwards from the peak, the centrifugal force of the brake assembly 100 also becomes reduced.

As shown in FIG. 8, as the centrifugal force of the brake assembly 100 reduces, the brake shoes 130 which are provided in the outer seating depressions 111 of the brake housing 110 move away from the inner surface of the first brake collar 92. Simultaneously, the brake shoes 130 which are provided in the inner seating depression 112 of the brake housing 110 are moved inwards by the elastic force of the expansion springs 140 and thus protrude towards the center of the brake assembly 100, while the support protrusions 132 of the brake shoes 130 are guided inwards along the corresponding guide slots 121 of the housing cover 120.

Thereby, the brake shoes 130 which are provided in the inner seating depressions 112 come into contact with the second brake collar or one way ring 94, thus reducing the rotating force of the spool 20, in other words, braking the spool 20. Hence, the fishing line is prevented from being entangled with the spool 20.

Figure 17:
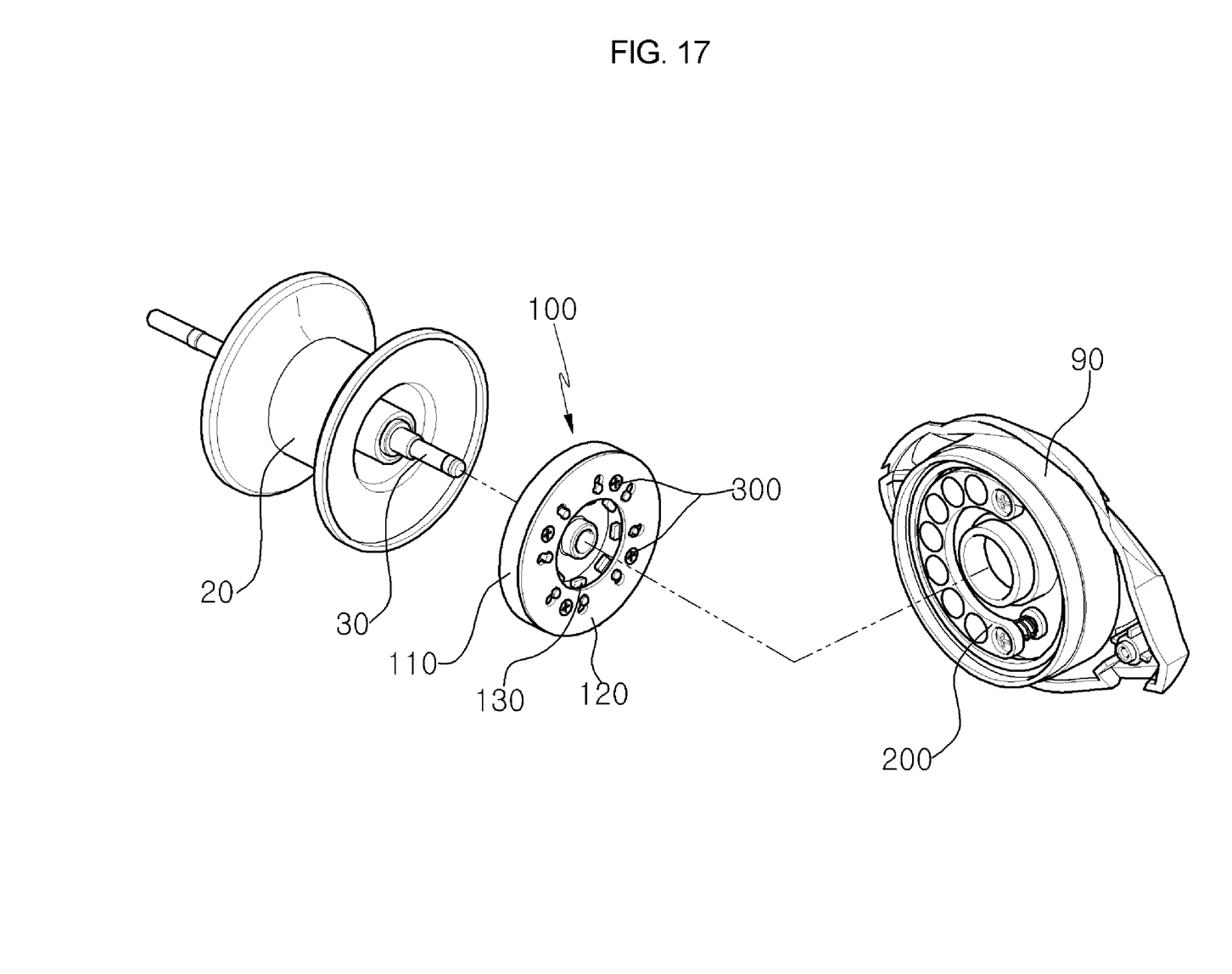
FIG. 17 is an exploded perspective view showing an example of a fishing reel provided with a magnetic brake according to the present invention.

Furthermore, in the brake system of the fishing reel 1 according to the present invention, the magnetic brake 200 may be mounted to the inner surface of the spool cover 90. In this case, the magnetic brake 200 which uses the magnetic braking mechanism, along with the brake assembly 100 which uses the centrifugal braking mechanism, appropriately controls the rotating force of the spool 20 in response to the force with which the fishing line is driven, thus maximizing the braking efficiency.

As described above, in the present invention, in combination with the existing centrifugal brake or magnetic brake, a brake assembly including a brake housing and a housing cover which are coupled to each other is provided between a spool and a spool cover. Here, brake shoes are provided in the brake housing of the brake assembly such that when the force with which a fishing line which was cast is driven is reduced, the brake shoes are biased inwards by expansionary force of expansion springs and are thus brought into contact with the spool cover. Therefore, when the spool is rotated by casting the fishing line, the brake shoes are retracted into the brake housing by the centrifugal force generated by the rotation of the spool. When the fishing line moves downwards after the peak, the brake shoes protrude from the brake assembly towards the center of the brake assembly and come into contact with the spool cover as the rotating force of the spool reduces. Thereby, the present invention can prevent the fishing line from becoming entangled, thus increasing convenience for a user. Therefore, not only an expert but also a beginner can use a fishing reel provided with the brake system of the present invention. In addition, the present invention can maximize the efficiency and reliability of the product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A brake system for a fishing reel, the fishing reel comprising: a frame having a right plate and a left plate; a spool provided in the frame between the left plate and the right plate so as to be rotatable, with a fishing line wound around the spool; a main shaft extending through the spool; a level-wind mechanism traversing the spool during winding such that the fishing line is evenly wound along an entire length of the spool; a right cover fastened to an outer surface of the right plate; a handle extending outwards from the right cover to rotate the spool; a reel foot provided on a bottom of the frame to attach the fishing reel to a fishing rod; and a left cover fastened to an outer surface of the left plate, the brake system comprising:

a spool cover provided between the spool and the left cover, the spool cover having: a cylindrical inner sidewall; a first brake collar provided on an inner surface of the sidewall; a circular protrusion provided on a central portion of the spool cover; and a second brake collar or one way ring provided on the circular protrusion; and a brake assembly provided between the spool and the spool cover, the brake assembly applying a braking operation to the second brake collar or one way ring when rotating force of the spool reduces after the fishing line is cast and a fishing sinker or fishing hook which is hung to an end of the fishing line passes over a peak, thus braking the rotation of the spool, wherein the brake assembly comprises:

a brake housing coupled to the main shaft. the brake housing being fastened to the spool;

a housing cover coupled to the brake housing;

a plurality of brake shoes provided in the brake housing; and an expansion spring elastically supporting each of the corresponding brake shoes.

2. The brake system for the fishing reel as set forth in claim 1, wherein outer seating depressions are formed in a perimeter an upper surface of the brake housing at positions spaced apart from each other at regular angular intervals. so that some of the brake shoes are respectively inserted into the outer seating depressions such that outer ends of the brake shoes are extractable outwards from a circumferential outer surface of the brake housing, inner seating depressions are respectively formed in the upper surface of the brake housing between the adjacent outer seating depressions inside the outer seating depressions, so that remaining brake shoes are inserted into the inner seating depressions such that inner ends of the brake shoes are extractable from a circumferential inner surface of the brake housing, a spring insert depression extends from each of the inner seating depressions, so that each of the expansion springs is inserted into the corresponding spring insert depression, and a plurality of locking depressions is formed in the circumferential outer surface of the brake housing.

3. The brake system for the fishing reel as set forth in claim 2, wherein stepped portions are provided in each of the inner and outer seating depressions to prevent the brake shoe from being removed therefrom.

4. The brake system for the fishing reel as set forth in claim 1, wherein each of the brake shoes has a stop protrusion on one end thereof and a support protrusion on an upper surface thereof.

5. The brake system for the fishing reel as set forth in claim 1, wherein guide slots are formed through a perimeter of the housing cover to guide the brake shoes inwards or outwards depending on the rotating force of the spool, and locking hooks are provided on a circumferential outer edge of the housing cover.

6. The brake system for the fishing reel as set forth in claim 1, wherein the brake assembly is made of synthetic resin.

7. The brake system for the fishing reel as set forth in claim 1, wherein a magnetic brake is mounted to an inner surface of the spool cover, and the brake assembly is made of metal such that a magnetic body of the magnetic brake is able to affect the brake assembly, the brake assembly being assembled using a flat head screw.

8. The brake system for the fishing reel as set forth in claim 1, wherein seating depressions are formed in a perimeter of an upper surface of the brake housing of the brake assembly at positions spaced apart from each other by regular angular intervals, and the brake shoes are respectively inserted into the seating depressions, wherein expansion springs are disposed in the corresponding seating depressions which contain the brake shoes which protrude inwards from a circumferential inner surface of the brake housing, and a stopper is provided under a lower surface of each of the corresponding brake shoes to support the corresponding expansion spring thereon.

* * * * *